(12) United States Patent
Bergh

(10) Patent No.: US 11,298,652 B2
(45) Date of Patent: Apr. 12, 2022

(54) HYBRID LOW DEW POINT COMPRESSED AIR DRYER

(71) Applicant: Ingersoll-Rand Industrial U.S., Inc., Davidson, NC (US)

(72) Inventor: Charles John Bergh, Berwyn, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 16/834,652

(22) Filed: Mar. 30, 2020

(65) Prior Publication Data

US 2020/0222850 A1 Jul. 16, 2020

Related U.S. Application Data

(63) Continuation of application No. 15/873,314, filed on Jan. 17, 2018, now Pat. No. 10,603,627.

(51) Int. Cl.
*B01D 53/26* (2006.01)
*B01D 53/04* (2006.01)
(Continued)

(52) U.S. Cl.
CPC ....... *B01D 53/261* (2013.01); *B01D 53/0446* (2013.01); *B01D 53/0454* (2013.01);
(Continued)

(58) Field of Classification Search
CPC .............. B01D 53/261; B01D 53/0446; B01D 53/0454; B01D 53/06; B01D 53/265;
(Continued)

(56) References Cited

U.S. PATENT DOCUMENTS 3,696,588 A * 10/1972 Dussourd .............. B60T 17/004
96/113
4,738,120 A *  4/1988 Lin ....................... F24F 3/1423
62/272

(Continued)

FOREIGN PATENT DOCUMENTS

EP        2263778 A1 ‡ 12/2010 ........... F25J 3/04157
EP        2263778 A1     12/2010
(Continued)

OTHER PUBLICATIONS

Kaeser Compressors, Inc., Wayne Perry and David Phillips, Hybrid Refrigerated/Desiccant Compressed Air Dryers, 2013 World Energy Engineering Congress, also published in Kaeser Compressors, Inc. Whitepaper Jan. 2014 (8 pages).‡

(Continued)

*Primary Examiner* — Stephen M Gravini
(74) *Attorney, Agent, or Firm* — Kevin E. West; Advent, LLP

(57) ABSTRACT

The present disclosure is directed to a dryer system for drying compressed gas discharged from a compressor. The dryer system includes a refrigeration drying system operable for removing moisture from the compressed gas and a desiccant drying system with a desiccant wheel located in series downstream of the refrigeration drying system operable for removing additional moisture from the compressed gas.

20 Claims, 2 Drawing Sheets

(51) Int. Cl.
*F24F 3/14* (2006.01)
*B01D 53/06* (2006.01)

(52) U.S. Cl.
CPC ........... *B01D 53/06* (2013.01); *B01D 53/265* (2013.01); *F24F 3/1429* (2013.01); *B01D 2257/80* (2013.01); *B01D 2259/4009* (2013.01)

(58) Field of Classification Search
CPC ......... B01D 2257/80; B01D 2259/4009; F24F 3/1429; F26B 3/1429
USPC .......................................................... 34/398
See application file for complete search history.

(56) References Cited

U.S. PATENT DOCUMENTS

| | | | | |
|---|---|---|---|---|
| 4,987,748 | A * | 1/1991 | Meckler | F24F 3/14 62/176.1 |
| 5,325,676 | A * | 7/1994 | Meckler | F24F 1/00075 62/93 |
| RE37,464 | E * | 12/2001 | Meckler | F24F 12/003 62/93 |
| 6,481,222 | B1 * | 11/2002 | Denniston | B64D 13/00 62/94 |
| 6,711,907 | B2 * | 3/2004 | Dinnage | F24F 3/1405 62/94 |
| 6,742,284 | B2 * | 6/2004 | Dinh | F26B 23/005 34/514 |
| 6,973,795 | B1 * | 12/2005 | Moffitt | F24F 3/1423 62/132 |
| 7,103,991 | B2 * | 9/2006 | Moulding | B01D 53/261 34/330 |
| 7,166,149 | B2 * | 1/2007 | Dunne | B01D 53/06 95/113 |
| 7,326,277 | B1 * | 2/2008 | Cohen | B01D 53/06 95/113 |
| 9,259,682 | B2 * | 2/2016 | Bergh | B01D 53/0462 |
| 9,844,798 | B2 * | 12/2017 | Bruischat | F26B 21/004 |
| 10,213,807 | B2 * | 2/2019 | Bruischat | B05D 7/14 |
| 10,240,602 | B2 * | 3/2019 | Able | F04C 18/16 |
| 2005/0150378 | A1 * | 7/2005 | Dunne | B01D 53/06 95/113 |
| 2014/0165637 | A1 * | 6/2014 | Ma | F24F 3/1423 62/186 |
| 2015/0290578 | A1 * | 10/2015 | Hwang | F24F 3/1411 96/115 |
| 2017/0036160 | A1 * | 2/2017 | Kitchener | F26B 5/16 |
| 2018/0087786 | A1 * | 3/2018 | Williams | F25B 39/04 |
| 2019/0217246 | A1 * | 7/2019 | Bergh | B01D 53/265 |
| 2020/0222850 | A1 * | 7/2020 | Bergh | B01D 53/0446 |

FOREIGN PATENT DOCUMENTS

| | | | | |
|---|---|---|---|---|
| EP | 3513861 | A1 * | 7/2019 | ........ B01D 53/0446 |
| JP | 4271950 | B2 | 6/2009 | |
| JP | 4627761 | B2 | 2/2011 | |
| WO | 0206732 | A1 | 1/2002 | |
| WO | 2005070518 | A1 | 8/2005 | |

OTHER PUBLICATIONS

Extended European Search Report, European Patent Application No. 19152038.6, dated Jun. 3, 2019, 8 pages.‡

* cited by examiner
‡ imported from a related application

HYBRID LOW DEW POINT COMPRESSED AIR DRYER

TECHNICAL FIELD

The present invention generally relates to a dryer for compressed air and more particularly, but not exclusively to a refrigeration-desiccant hybrid dryer for producing low dew point temperature compressed air.

BACKGROUND

Dryers are sometimes used to remove moisture from compressed air downstream of the compression process. Certain prior art dryers incorporate refrigerant based systems or desiccant based systems to remove moisture from compressed air. Some existing dryer systems have various shortcomings relative to certain applications. Accordingly, there remains a need for further contributions in this area of technology.

SUMMARY

One embodiment of the present disclosure includes a hybrid air dryer with a refrigerant system and a desiccant system operating in series. Other embodiments include apparatuses, systems, devices, hardware, methods, and combinations for a hybrid air dryer are disclosed herein. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
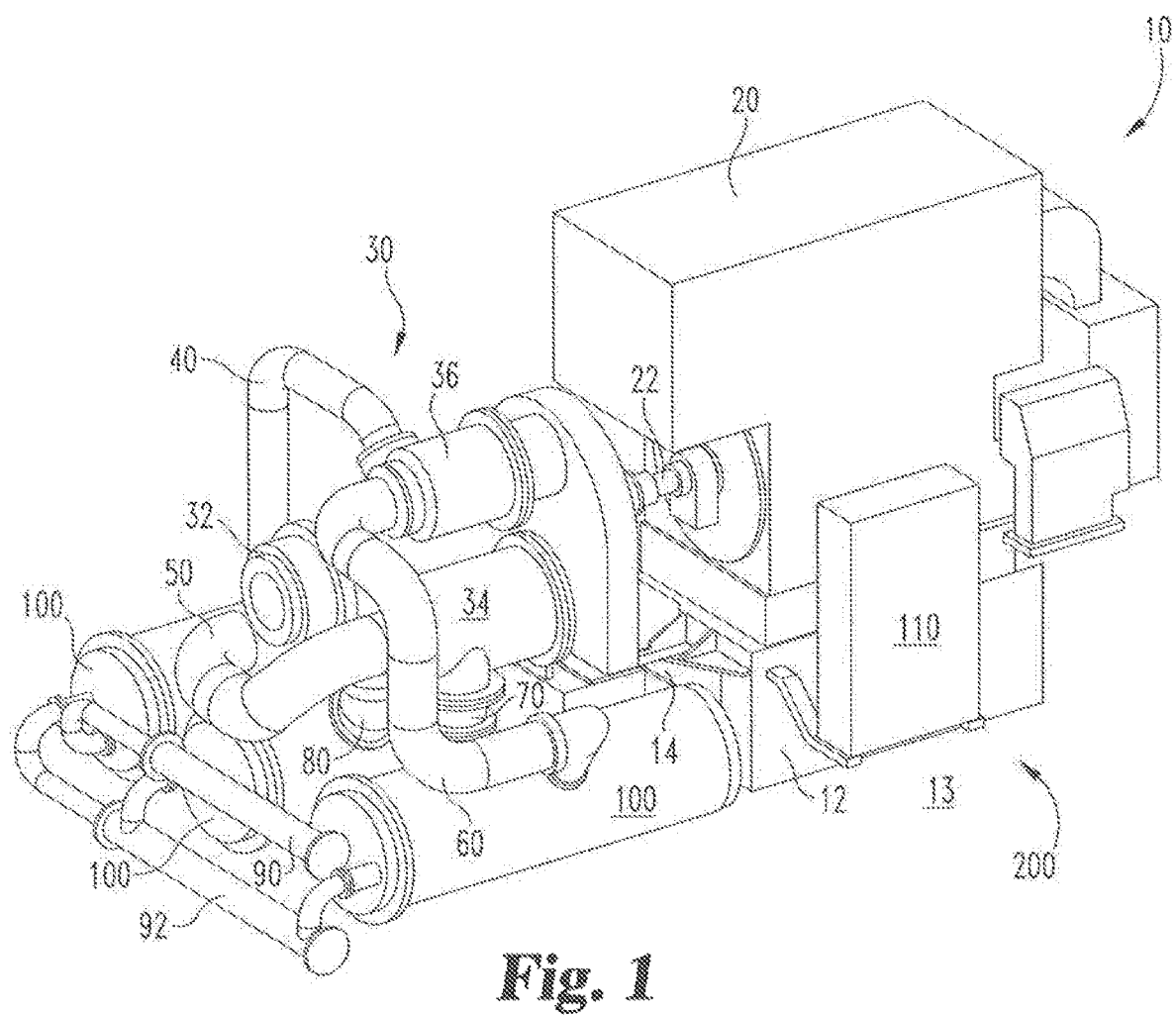
FIG. 1 is a perspective view of an exemplary compressor system that may be used in one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

An exemplary embodiment of a hybrid air dryer system is disclosed herein. The hybrid air dryer system can be used with any type of fluid compression device and should not be limited to the illustrative compressor system shown in FIG. 1. The term "fluid" should be understood to include any gas or liquid medium that can be used in the compressor system as disclosed herein. It should also be understood that air is a typical working fluid, but different fluids or mixtures of fluid constituents can be used and remain within the teachings of the present disclosure, therefore terms such as fluid, air, compressible gas, etc., can be used interchangeably in the present patent application. For example, in some embodiments it is contemplated that a hydrocarbon gaseous fuel including natural gas and propane, or inert gases including nitrogen and argon may be used as a primary working fluid in addition to ambient air.

Referring now to FIG. 1, an exemplary compressor system 10 can be used to compress a working fluid such as ambient air according to one embodiment of the present application. The compressor system 10 includes a primary motive source 20 such as an electric motor, an internal combustion engine or a fluid-driven turbine and the like. The compressor system 10 can include a compressor 30 with multi-stage compression and in the exemplary embodiment includes a first stage compressor 32, a second stage compressor 34, and a third stage compressor 36. In other embodiments a different number of compressor stages may be employed with the compressor 30. The primary motive source 20 is operable for driving the compressor 30 via a drive shaft 22 to compress fluids such as air or the like. It should be understood that the compressor 30 for use with the drying system described herein can be of any type including centrifugal, axial, rotary screw and/or other positive displacement compression means.

A structural base 12 can be configured to support at least portions of the compressor system 10 on a support surface 13 such as a floor or ground and the like. One or more extensions or arms 14 can extend from the base 12 and is configured to hold portions of the compressor system 10. Portions of the compressed air discharged from the compressor 30 can be transported through one or more conduits 40, 50, 60, 70 and 80 to one or more intercoolers 100 and/or to another compressor stage. An inlet fluid manifold 90 and an outlet fluid manifold 92 can be fluidly connected to the intercoolers 100 to provide cooling fluid such as water or other liquid coolant to cool the compressed air after discharge from one or more of the compressor stages of the compressor 30. The compressor system 10 can also include a controller 110 operable for controlling the primary motive power source and various valving and fluid control mechanisms (not shown) between the compressor 30 and intercoolers 100. The compressor system of FIG. 1 is only one exemplary form of a compressor system that can be used with the teachings of the present disclosure. Other forms and configurations are also contemplated herein. By way of example and not limitation, portable compressor systems or compressor systems that are mounted onto engines for industrial operation, land vehicle operation, or water vessel operation as well as screw type or piston type can be used with the teachings of the present disclosure.

Figure 2:
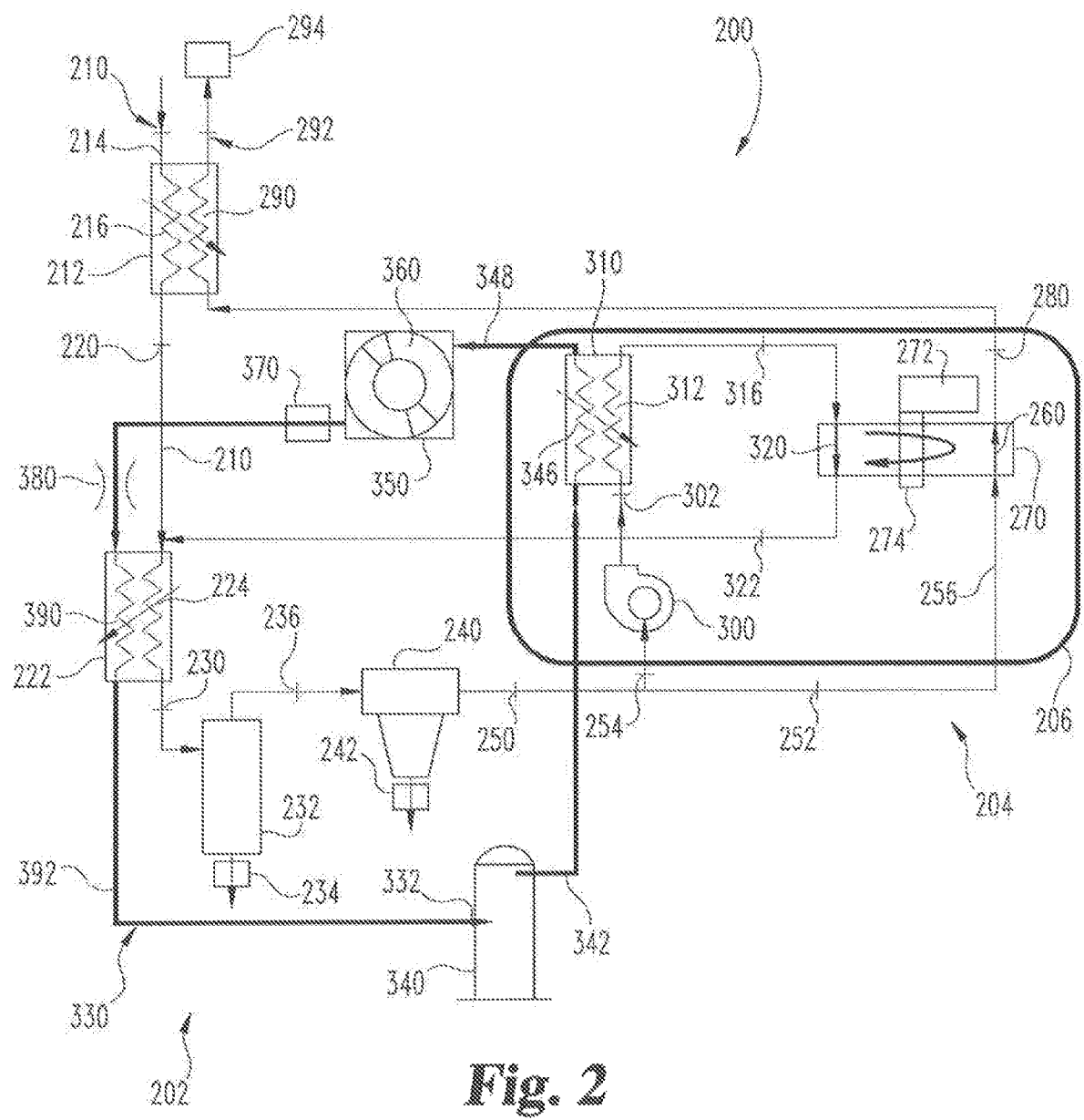
FIG. 2 is a schematic view of a hybrid dryer system according to one exemplary embodiment of the present disclosure.

Referring now to FIG. 2 a hybrid dryer system 200 is shown in schematic form. The hybrid dryer system 200 includes a refrigeration drying system 202 and a desiccant wheel drying system 204. A sealed housing 206 can form a pressure vessel about at least a portion of the desiccant wheel drying system 204. The dryer system 200 includes a gas flow path 210 configured to receive and transport humidified or moist compressed gas such as air from a compressor to the refrigeration drying system 202 and subsequently to the desiccant wheel drying system 204. The dryer system 200 removes at least a portion of the moisture entrained in the gas so that an end user receives compressed gas with a moisture content below a desired threshold.

The gas flow path 210 enters into a first heat exchanger 212 through an inlet 214. The gas flow path then flows to a pre-cooler portion 216 of the first heat exchanger 212. The pre-cooler 216 operates to provide an initial cooling to the compressed gas discharged from the compressor. After exiting the first heat exchanger 212 the gas will enter into a first conduit 220 which directs the gas flow path 210 into a second heat exchanger 222. The second heat exchanger 222 includes an air chiller 224 operable for reducing the temperature of the gas so that liquid water particles condense out of the compressor gas stream. The gas flow path 210 includes a second conduit 230 that is connected between the second heat exchanger and a moisture separator 232. The moisture separator 232 can include internal features such as baffles or the like that promote separation of liquid content such as water or other liquid material after condensing into liquid particles. The liquid content can then be drained externally from the system through a first drain valve 234.

After passage through the moisture separator 232 the gas flow path 210 is directed into a third conduit 236 that is connected to a coalescing filter 240. The coalescing filter 240 can filter solid particles as well as liquid particles condensed in the gas flow. The solid and liquid particles can then be drained through a second drain valve 242. In some forms, the dryer system 200 may omit the coalescing filter 240 and in other forms the moisture separator 232 and coalescing filter 240 can drain into a single drain valve. From the coalescing filter 240, the gas flow path 210 enters to a fourth conduit 250 and is then separated into a primary first flow stream 252 and into a secondary flow stream 254. The primary flow stream 252 passes through a fifth conduit 256 and into a drying flow path 260 formed through a desiccant wheel 270. The drying flow path 260 can include one or more separate flow paths and can include tortuous or linear segments as defined by the internal design of the desiccant wheel 270. The desiccant wheel 270 includes desiccant material configured to adsorb moisture from the gas flow as the desiccant wheel 270 rotates as one skilled in the art would readily understand. After the compressed gas in the primary flow path has been dried within desiccant wheel 270, the compressed gas is directed through a sixth conduit 280 back to the first heat exchanger 212. The first heat exchanger 212 includes a re-heater portion 290 that exchanges heat with compressed gas flowing through the pre-cooler portion 216 at the entrance of the gas flow path 210. After the dried gas flows through the re-heater 290 the dried gas exits through an outlet 292 of the first heat exchanger 212 and is directed to an end use machine or compressed air system or a storage tank 294.

The secondary flow stream 254 is be directed to a regeneration blower 300 after splitting off from the primary flow stream 252. The regeneration blower 300 provides additional flow pressure causing the secondary flow stream 254 to flow through a seventh conduit 302 at a desired flow rate to a third heat exchanger 310. Typically, the secondary flow stream can range from about ten to twenty percent of the total compressed gas flow. However, in some embodiments the flow rate of the secondary flow stream may be above or below this range. The third heat exchanger 310 includes a regeneration gas heater portion 312 operable to increase the temperature of the gas after the gas has been compressed in a refrigeration circuit 330. The refrigeration circuit 330 will be described below.

The secondary flow stream 254 is then directed through an eighth conduit 316 and to a regeneration flow path 320 extending through the desiccant wheel 270. The regeneration flow path 320 provides a relatively dry and hot gas for drying or regenerating the desiccant in the desiccant wheel 270. In this manner, the desiccant in the desiccant wheel 270 can be continuously regenerated via the regeneration flow path 320 and continuously dry the compressed gas in the primary flow stream 252 as the desiccant wheel 270 rotates. Similar to the drying flow path 260, the regeneration flow path 320 can include one or more separate flow paths that can include tortuous portions and linear portions to desorb moisture from the desiccant in the desiccant wheel 270.

An electric motor 272 may rotate the desiccant wheel 270 by way of a rotatable shaft 274 at a speed designed to effectively dry a continuous flow of the compressed gas to a desired pressure dew point temperature while simultaneously regenerating the desiccant with the secondary flow stream 254. In this manner the desiccant wheel 270 is continuously drying the primary gas flow in one location and is continuously regenerated at another location. After the secondary flow stream 254 exits the regeneration flow path 320 of the desiccant wheel 270, the secondary flow path is directed to a ninth conduit 322 and subsequently merges back into the gas flow path 210 upstream of the second heat exchange 222.

The refrigeration circuit flow path 330 includes a compressor inlet 332 configured to direct refrigerant into a refrigerant compressor 340. The refrigerant compressor 340 will compress a relatively cool low pressure gaseous refrigerant and produce a relatively high pressure and hot gaseous refrigerant that is discharged into a compressor outlet flow path 342. The high pressure refrigerant then flows into the third heat exchanger 310 through a pre-condenser/cooler portion 346 of the third heat exchanger 310. The third heat exchanger 310 exchanges heat between the secondary flow stream 254 and the refrigerant flowing through the pre-condenser 346. The refrigerant gas is cooled in the pre-condenser/cooler 346 prior to exiting through a pre-condenser outlet 348. The cooled high pressure gaseous refrigerant then passes through a condenser 350 where the refrigerant is further cooled as is known to one skilled in the art.

A condenser blower 360 can direct a coolant flow such as ambient air through the condenser 350 to remove heat from the pressurized refrigerant and condense into a liquid form. A temperature or pressure control valve 370 can control the desired pressure and temperature of the refrigerant within the refrigerant condenser 350. After exiting the condenser 350 the refrigerant can be expanded in an expansion device 380 to cool the refrigerant to a desired temperature. After being cooled in the expansion device 380, the refrigerant is directed through an evaporator portion 390 of the second heat exchanger 222. The evaporator portion 390 receives heat from the compressed gas flow and conversely cools the compressed gas flowing through the air chiller 224. The refrigerant exits the evaporator 390 in a low pressure gaseous form. After exiting the evaporator 390 of the second heat exchanger 222, the refrigerant will flow through the evaporator outlet 392 and back to the refrigerant compressor 340 to complete the refrigerant circuit flow path 330. In this manner the compressed gas is dried to a first pressure dew point temperature in a refrigerant dryer system 202 and then further dried to a lower pressure dew point temperature in a desiccant wheel system 204. In one exemplary form the pressure dew point of compressed gas can be reduced below freezing while the actual temperature, remains above freezing after exiting the desiccant drier system 204.

In one aspect, a system comprises a fluid compressor operable to compress a working fluid; a dryer system in fluid communication with the compressor, the dryer system comprising: a refrigeration drying system operable for removing moisture from the working fluid; and a desiccant drying system located downstream of the refrigeration drying system, the desiccant drying system operable for removing additional moisture from the working fluid.

In refining aspects, the desiccant drying system includes a desiccant wheel; wherein the working fluid downstream of the refrigeration drying system is split into a first flow stream and a second flow stream; wherein additional moisture is removed from the first flow stream in the desiccant wheel; wherein the second flow stream regenerates the desiccant wheel; wherein a pressure dew point temperature of the first flow stream is subfreezing and an actual temperature of the first flow stream is above freezing downstream of the desiccant wheel; wherein the pressure dew point temperature is approximately negative 10 degrees F. and the actual temperature is approximately 40 degrees F.; wherein a mass flow rate of the first flow stream is approximately eighty percent of a combined mass flow rate of the first and second flow streams; wherein the second flow stream merges with the compressed working fluid between a precooler and a refrigerant evaporator after exiting the desiccant wheel; wherein the first flow stream flows through a preheater downstream of the desiccant wheel.

In another aspect, a gas dryer comprises a primary gas flow path extending through a refrigerant dryer circuit and subsequently through a desiccant dryer circuit; a secondary gas flow path split off from the primary gas flow path downstream of the refrigerant dryer circuit; a moisture separator positioned in the refrigerant dryer circuit configured to remove moisture from the gas in the primary gas flow path; a desiccant wheel positioned in the desiccant dryer circuit configured to remove additional moisture from the gas in the primary gas flow path; and a regeneration flow path extending through the desiccant wheel, the regeneration flow path in fluid communication with the secondary gas flow path.

In refining aspects, the gas dryer further comprises a coalescing filer positioned downstream of the moisture separator; at least one drain valve in fluid communication with the moisture separator and the coalescing filter; a regeneration blower operably connected with the secondary gas flow path; a regeneration gas heater positioned in the secondary gas flow path upstream of the desiccant wheel; comprising a motive source operable to rotate the desiccant wheel; secondary gas flow path includes an outlet downstream of the desiccant wheel connected to the primary gas flow path upstream of an evaporator in the refrigerant drying circuit.

In yet another aspect, a method comprises transporting a primary flow stream of pressurized working fluid discharged from a compression device through a primary flow path; cooling the pressurized working fluid in a precooler heat exchanger; chilling the pressurized working fluid in a refrigerant evaporator; separating a first quantity of moisture from the pressurized working fluid in a moisture separator located in a refrigerant circuit downstream of the evaporator, separating a second quantity of moisture from the pressurized working fluid in a desiccant wheel downstream of the first moisture separator; and reheating the pressurized working fluid prior to delivery to an end user.

In refining aspects, the method further comprises separating the pressurized working fluid from the primary flow stream into first and second flow streams upstream of the desiccant wheel; flowing the first flow stream through the desiccant wheel; drying the pressurized working fluid in the first flow stream; and wherein the pressure dew point temperature of the pressurized working fluid downstream of the desiccant wheel is below 32 degrees F. and the actual temperature is above 32 degrees F.; flowing the second flow stream through the desiccant wheel; regenerating the desiccant wheel by removing moisture with the pressurized working fluid in the second flow stream; merging the second flow stream with the primary flow stream upstream of the evaporator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A dryer system for drying a pre-compressed fluid comprising:
    a fluid compressor operable to compress a working fluid, the working fluid compressed by the fluid compressor including liquid particles condensed in a gas flow;
    a dryer system for drying the compressed working fluid in fluid communication with the compressor, the dryer system comprising:
    a first heat exchanger having a pre-cooler portion for pre-cooling the compressed working fluid,
    a refrigeration drying system including:
        a second heat exchanger located downstream from the first heat exchanger, the second heat exchanger having a cooler for further reducing the temperature of the compressed working fluid, and
        a coalescing filter located downstream from the second heat exchanger, operable for removing moisture from the working fluid; and
    a desiccant drying system located downstream of the refrigeration drying system, the desiccant drying system operable for removing additional moisture from the working fluid.

2. The system of claim 1, wherein the desiccant drying system includes a desiccant wheel.

3. The system of claim 2, wherein the working fluid downstream of the refrigeration drying system is split into a first flow stream and a second flow stream.

4. The system of claim 3, wherein additional moisture is removed from the first flow stream in the desiccant wheel.

5. The system of claim 3, wherein the second flow stream regenerates the desiccant wheel after being heated by hot discharge gas from a refrigeration compressor.

6. The system of claim 3, wherein the second flow stream merges with the working fluid compressed by the fluid compressor after exiting the desiccant wheel.

7. The system of claim 6, wherein the second flow stream merges with the working fluid compressed by the fluid compressor between the precooler and a refrigerant evaporator after exiting the desiccant wheel.

8. The system of claim 3, wherein the second flow stream merges with the working fluid compressed by the fluid compressor upstream of the coalescing filter such that the coalescing filter filters liquid particles from the gas flow of the working fluid after the second flow stream is merged with the working fluid.

9. A gas dryer for a pre-compressed gas comprising:
a primary gas flow path extending through a refrigerant dryer circuit and subsequently through a desiccant dryer circuit;
a coalescing filter located in the refrigerant dryer circuit configured to remove moisture from a gas in the primary gas flow path prior to entering the desiccant dryer circuit;
a secondary gas flow path split off from the primary gas flow path downstream of the coalescing filter and upstream of the desiccant dryer circuit;
a desiccant wheel positioned in the desiccant dryer circuit configured to remove additional moisture from the gas in the primary gas flow path; and
a regeneration flow path extending through the desiccant wheel, the regeneration flow path in fluid communication with the secondary gas flow path.

10. The gas dryer of claim 9, further comprising: a moisture separator positioned in the refrigerant dryer circuit and configured to remove moisture from the gas in the primary gas flow path.

11. The gas dryer of claim 10, wherein the coalescing filter is positioned downstream of the moisture separator.

12. The gas dryer of claim 10 further comprising at least one drain valve in fluid communication with the moisture separator and the coalescing filter.

13. The gas dryer of claim 9 further comprising a regeneration blower operably connected with the secondary gas flow path.

14. The gas dryer of claim 9 further comprising a regeneration gas heater positioned in the secondary gas flow path upstream of the desiccant wheel.

15. The gas dryer of claim 9, wherein secondary gas flow path includes an outlet downstream of the desiccant wheel connected to the primary gas flow path upstream of an evaporator in the refrigerant drying circuit.

16. A method of drying a pre-compressed working fluid comprising:
transporting a primary flow stream of pressurized working fluid discharged from a compression device through a primary flow path, the primary flow path extending through a refrigerant dryer circuit;
filtering from the pressurized working fluid, in a coalescing filter located in the refrigerant dryer circuit, at least one of solid particles and liquid particles condensed in the pressurized working fluid;
transporting the primary flow stream through a desiccant dryer circuit; and
separating moisture from the pressurized working fluid in a desiccant wheel located in the desiccant dryer circuit, downstream of the coalescing filter.

17. The method of claim 16, further comprising separating the pressurized working fluid from the primary flow stream into first and second flow streams upstream of the desiccant wheel and downstream of the coalescing filter.

18. The method of claim 17, further comprising:
flowing the first flow stream through the desiccant wheel;
drying the pressurized working fluid in the first flow stream; and
wherein a pressure dew point temperature of the pressurized working fluid downstream of the desiccant wheel is below 32 degrees F. and an actual temperature is above 32 degrees F.

19. The method of claim 17, further comprising:
flowing the second flow stream through the desiccant wheel;
regenerating the desiccant wheel by removing moisture with the pressurized working fluid in the second flow stream;
merging the second flow stream with the primary flow stream upstream of an evaporator.

20. The method of claim 16, further comprising:
cooling the pressurized working fluid in a precooler heat exchanger;
chilling the pressurized working fluid in a refrigerant evaporator located in the refrigerant dryer circuit;
separating moisture from the pressurized working fluid in a moisture separator located downstream of the precooler heat exchanger; and
reheating the pressurized working fluid prior to delivery to an end user.

* * * * *